US012602928B2

(12) United States Patent
Lee et al.

(10) Patent No.: US 12,602,928 B2
(45) Date of Patent: Apr. 14, 2026

(54) MASK PROPAGATION FOR VIDEO SEGMENTATION

(71) Applicant: Adobe Inc., San Jose, CA (US)

(72) Inventors: Joon-Young Lee, San Jose, CA (US);
Seoung Wug Oh, San Jose, CA (US);
Ho Kei Cheng, Champaign, IL (US);
Brian Price, Pleasant Grove, UT (US)

(73) Assignee: Adobe Inc., San Jose, CA (US)

( * ) Notice: Subject to any disclaimer, the term of this patent is extended or adjusted under 35 U.S.C. 154(b) by 468 days.

(21) Appl. No.: 18/356,892

(22) Filed: Jul. 21, 2023

(65) Prior Publication Data

US 2025/0029386 A1      Jan. 23, 2025

(51) Int. Cl.
| | |
|---|---|
| *G06V 20/40* | (2022.01) |
| *G06T 7/174* | (2017.01) |
| *G06T 7/187* | (2017.01) |
| *G06T 7/194* | (2017.01) |
| *G06V 10/77* | (2022.01) |

(52) U.S. Cl.
CPC .............. *G06V 20/48* (2022.01); *G06T 7/174* (2017.01); *G06T 7/187* (2017.01); *G06T 7/194* (2017.01); *G06V 10/7715* (2022.01); *G06V 20/49* (2022.01); *G06T 2207/10016* (2013.01); *G06T 2207/20021* (2013.01); *G06T 2207/20081* (2013.01); *G06T 2207/20084* (2013.01)

(58) Field of Classification Search
CPC ........... G06T 2207/10016; G06T 7/194; G06T 7/174; G06T 7/10; G06V 20/48; G06V 20/49; G06V 10/20
See application file for complete search history.

(56) References Cited

U.S. PATENT DOCUMENTS

| | | | |
|---|---|---|---|
| 2009/0154807 A1* | 6/2009 | Rossato ................. | G06T 7/155 |
| | | | 382/199 |
| 2013/0121577 A1* | 5/2013 | Wang ................... | G06V 10/764 |
| | | | 382/173 |

(Continued)

OTHER PUBLICATIONS

Bertasius et al., Classifying, Segmenting, and Tracking Object Instances in Video with Mask Propagation, CVPR 2020, pp. 9739-9748, arXiv: 1912.04573, doi: 10.48550/arXiv.1912.0457, furnished via IDS.*

(Continued)

*Primary Examiner* — Guillermo M Rivera-Martinez
(74) *Attorney, Agent, or Firm* — Nicholson De Vos Webster & Elliott LLP

(57) ABSTRACT

Embodiments are disclosed for performing universal segmentation to mask objects across multiple frames of a video. The method may include determining an image segmentation mask which masks an object of a frame of a video sequence using the frame and an image segmentation module of a segmentation system. The method further includes determining a mask propagation mask which masks the object of the frame of the video sequence using the frame, a representation of a previous frame of the video sequence, and a mask propagation module of the segmentation system. The method further includes determining a frame mask which masks the object of the frame of the video sequence based on a comparison of the image segmentation mask and the mask propagation mask. The method further includes displaying the frame mask of the video sequence.

20 Claims, 8 Drawing Sheets

(56) References Cited

U.S. PATENT DOCUMENTS

| | | | | |
|---|---|---|---|---|
| 2019/0311202 A1* | 10/2019 | Lee | .......................... | G06T 9/002 |
| 2020/0117906 A1* | 4/2020 | Lee | ..................... | G06V 10/764 |
| 2020/0143171 A1* | 5/2020 | Lee | .......................... | G06T 7/194 |
| 2021/0383171 A1* | 12/2021 | Lee | ..................... | G06F 18/217 |
| 2021/0390700 A1* | 12/2021 | Lee | .......................... | G06F 18/25 |
| 2021/0397876 A1* | 12/2021 | Hemani | ............... | G06V 10/761 |
| 2021/0406589 A1* | 12/2021 | Yadav | ....................... | G06T 7/11 |
| 2023/0222669 A1* | 7/2023 | Zhao | .......................... | G06T 7/12 |
| | | | | 382/155 |

OTHER PUBLICATIONS

Weng et al., Mask Propagation for Efficient Video Semantic Segmentation, NeurIPS 2023, pp. 1-20, arXiv:2310.18954, doi: 10.48550/arXiv.2310.18954.*

Garg et al., Mask Selection and Propagation for Unsupervised Video Object Segmentation, , WACV 2021, pp. 1680-1690, doi: 10.1109/WACV48630.2021.0017.*

Athar, A., et al., "HODOR: High-Level Object Descriptors for Object Re-Segmentation in Video Learned From Static Images", Proceedings of the IEEE/CVF Conference on Computer Vision and Pattern Recognition (CVPR), Jul. 15, 2022, pp. 1-17.

Bertasius, G., et al., "Classifying, Segmenting, and Tracking Object Instances in Video with Mask Propagation", Proceedings of the IEEE/CVF Conference on Computer Vision and Pattern Recognition (CVPR), 2020, pp. 9739-9748.

Cheng, B., et al., "Masked-Attention Mask Transformer for Universal Image Segmentation", Proceedings of the IEEE/CVF Conference on Computer Vision and Pattern Recognition (CVPR), Jun. 15, 2022, pp. 1-20.

Cheng, H. K., et al., "Modular Interactive Video Object Segmentation: Interaction-to-Mask, Propagation and Difference-Aware Fusion", Proceedings of the IEEE/CVF Conference on Computer Vision and Pattern Recognition (CVPR), Mar. 21, 2021, pp. 1-10.

Cheng, H. K., et al., "Rethinking Space-Time Networks with Improved Memory Coverage for Efficient Video Object Segmentation", Advances in Neural Information Processing Systems 34, Oct. 8, 2021, pp. 1-19.

Cheng, H. K., et al., "XMem: Long-Term Video Object Segmentation with an Atkinson-Shiffrin Memory Model", European Conference on Computer Vision, vol. 13688, 2022, 28 pages.

He, K., et al., "Mask R-CNN", Proceedings of the IEEE International Conference on Computer Vision (ICCV), 2017, pp. 2961-2969.

Huang, D. A., et al., "MinVIS: A Minimal Video Instance Segmentation Framework without Video-based Training", Advances in Neural Information Processing Systems 35 (NeurIPS 2022), Aug. 3, 2022, pp. 1-15.

Hwang, S., et al., "Video Instance Segmentation using Inter-Frame Communication Transformers", Advances in Neural Information Processing Systems 34 (NeurIPS 2021), Jun. 7, 2021, pp. 1-11.

Jabri, A., et al., "Space-Time Correspondence as a Contrastive Random Walk", Advances in Neural Information Processing Systems 33 (NeurIPS 2020), Dec. 3, 2020, pp. 1-20.

Jampani, V., et al., "Video Propagation Networks", Proceedings of the IEEE Conference on Computer Vision and Pattern Recognition (CVPR), Apr. 11, 2017, 16 pages.

Khoreva, A., et al., "Learning Video Object Segmentation from Static Images", Proceedings of the IEEE Conference on Computer Vision and Pattern Recognition (CVPR), Dec. 8, 2016, 16 pages.

Kim, D., et al., "Video Panoptic Segmentation", Proceedings of the IEEE/CVF Conference on Computer Vision and Pattern Recognition (CVPR), 2020, pp. 9859-9868.

Kirillov, A., et al., "Segment Anything", arXiv:2304.02643 [cs.CV], Apr. 5, 2023, 30 pages.

Li, X., et al., "Video K-Net: A Simple, Strong, and Unified Baseline for Video Segmentation", Proceedings of the IEEE/CVF Conference on Computer Vision and Pattern Recognition (CVPR), 2022, pp. 18847-18857.

Liu, Y., et al., "Learning Quality-aware Dynamic Memory for Video Object Segmentation", European Conference on Computer Vision, Jul. 16, 2022, pp. 468-486.

Liu, Y., et al., "Opening up Open World Tracking", Proceedings of the IEEE/CVF Conference on Computer Vision and Pattern Recognition (CVPR), Mar. 28, 2022, pp. 1-18.

Miao, J., et al., "Large-Scale Video Panoptic Segmentation in the Wild: A Benchmark", Proceedings of the IEEE/CVF Conference on Computer Vision and Pattern Recognition (CVPR), 2022, pp. 21033-21043.

Oh, S. W., et al., "Video Object Segmentation Using Space-Time Memory Networks", Proceedings of the IEEE/CVF International Conference on Computer Vision (ICCV), Aug. 12, 2019, pp. 9226-9235.

Park, K., et al., "Per-Clip Video Object Segmentation", Proceedings of the IEEE/CVF Conference on Computer Vision and Pattern Recognition (CVPR), Aug. 3, 2022, pp. 1352-1361.

Perazzi, F., et al., "A Benchmark Dataset and Evaluation Methodology for Video Object Segmentation", Proceedings of the IEEE Conference on Computer Vision and Pattern Recognition (CVPR), 2016, pp. 724-732.

Qi, L., et al., "Open World Entity Segmentation", IEEE Transactions on Pattern Analysis and Machine Intelligence, vol. 45, No. 7, Jul. 1, 2023, pp. 8743-8756.

Qiao, S., et al., "ViP-DeepLab: Learning Visual Perception with Depth-aware Video Panoptic Segmentation", Proceedings of the IEEE/CVF Conference on Computer Vision and Pattern Recognition (CVPR), 2021, pp. 3997-4008.

Wang, Y., et al., "End-to-End Video Instance Segmentation With Transformers", Proceedings of the IEEE/CVF Conference on Computer Vision and Pattern Recognition (CVPR), Oct. 8, 2021, pp. 8741-8750.

Wang, Z., et al., "Do Different Tracking Tasks Require Different Appearance Models?", Part of Advances in Neural Information Processing Systems 34 (NeurIPS 2021), 2021, 13 pages.

Xu, J., et al., "Rethinking Self-Supervised Correspondence Learning: A Video Frame-Level Similarity Perspective", Proceedings of the IEEE/CVF International Conference on Computer Vision (ICCV), Oct. 14, 2021, pp. 10075-10085.

Xu, X., et al., "Reliable Propagation-Correction Modulation for Video Object Segmentation", Proceedings of the AAAI Conference on Artificial Intelligence, vol. 36, No. 3, Jun. 28, 2022, pp. 2946-2954.

Yan, B., et al., "Towards Grand Unification of Object Tracking", European Conference on Computer Vision, Oct. 23, 2022, pp. 733-751.

Yang, L., et al., "Video Instance Segmentation", Proceedings of the IEEE/CVF International Conference on Computer Vision (ICCV), 2019, pp. 5188-5197.

Yang, Z., et al., "Associating Objects with Transformers for Video Object Segmentation", Advances in Neural Information Processing Systems 34 (NeurIPS 2021), 2021, 12 pages.

* cited by examiner

SEGMENTATION SYSTEM 600

FRAME MANAGER 602

ASSOCIATION MODULE 604

MASK COMPILER 606

IMAGE SEGMENTATION SUB- MODULE 622

MASK PROPAGATION SUB- MODULE 624

NEURAL NETWORK MANAGER 608

TRAINING MANAGER 610

USER INTERFACE MANAGER 612

REPRESENTATION OF PAST FRAMES 626

INPUT FRAMES 628

MASKED FRAMES 630

STORAGE MANAGER 614

700

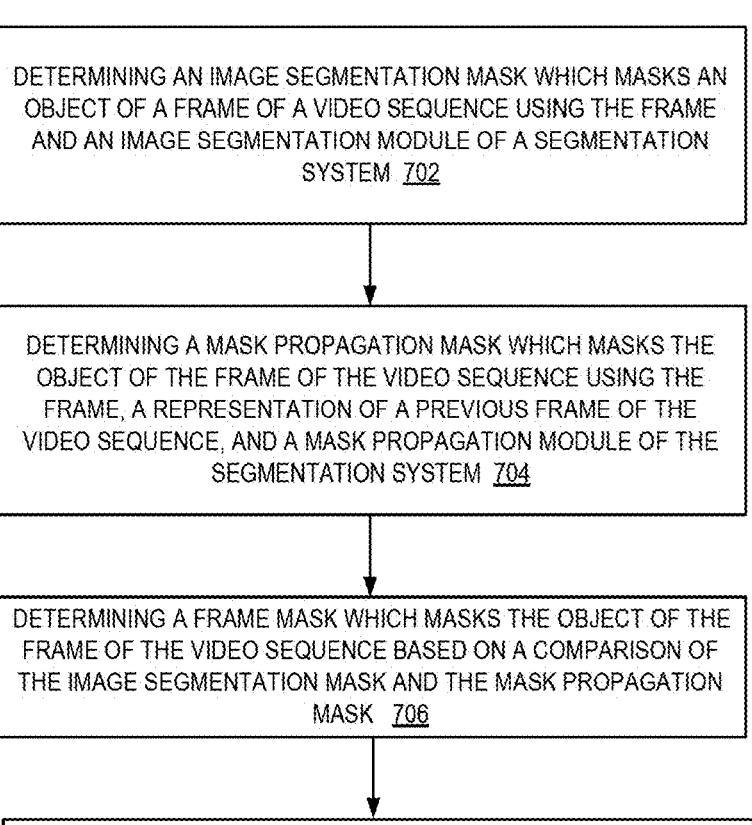

DETERMINING AN IMAGE SEGMENTATION MASK WHICH MASKS AN OBJECT OF A FRAME OF A VIDEO SEQUENCE USING THE FRAME AND AN IMAGE SEGMENTATION MODULE OF A SEGMENTATION SYSTEM 702

DETERMINING A MASK PROPAGATION MASK WHICH MASKS THE OBJECT OF THE FRAME OF THE VIDEO SEQUENCE USING THE FRAME, A REPRESENTATION OF A PREVIOUS FRAME OF THE VIDEO SEQUENCE, AND A MASK PROPAGATION MODULE OF THE SEGMENTATION SYSTEM 704

DETERMINING A FRAME MASK WHICH MASKS THE OBJECT OF THE FRAME OF THE VIDEO SEQUENCE BASED ON A COMPARISON OF THE IMAGE SEGMENTATION MASK AND THE MASK PROPAGATION MASK 706

DISPLAYING THE FRAME MASK OF THE VIDEO SEQUENCE 708

*FIG. 7*

MASK PROPAGATION FOR VIDEO SEGMENTATION

BACKGROUND

Panoptic segmentation is a technique of classifying each pixel in an image as belonging to a particular object. In this manner, particular objects of an image are segmented, or otherwise delineated from other objects of the image. For example, class agnostic panoptic segmentation can segment individual people in an image as object 1, object 2, etc. The segmented objects can be displayed as masked objects in each frame. Video panoptic segmentation segments objects throughout a video. That is, the segmented objects are propagated through each frame of the multiple frames included in a video to mask objects in the video.

SUMMARY

Introduced here are techniques/technologies that perform universal segmentation (e.g., panoptic segmentation, semantic segmentation, instance segmentation, etc.) to mask objects across multiple frames of a video. The segmentation system described herein leverages a decoupled image segmentation sub-module and a mask propagation sub-module to scale segmented objects of frames in the image domain to the video domain through association of the segmented objects using a memory of segmented objects in previous frames. An image segmentation sub-module segments objects in frames of the video sequence. A mask propagation sub-module leverages memory that stores feature representations of previously masked frames to determine temporally coherent masks of a sequence of input frames.

The segmentation system of the present disclosure uses the decoupled modules of the segmentation system to create temporally coherent masks of segmented objects in the frames of the video. The output of both the image segmentation sub-module and the mask propagation sub-module are compared to obtain a coarse estimation of the masked objects in a frame. A refined mask is determined by the mask propagation sub-module and is based on positional information of previously masked frames. The interaction of the outputs of the image segmentation sub-module and the mask propagation sub-module allows the segmentation system to identify new objects of a frame by matching segments in propagated masks with segments detected by the image segmentation sub-module. The resulting masked frames are temporally coherent because the same objects appearing in multiple frames over time are masked consistently. The implementation of the decoupled modules performing relatively simple tasks (e.g., image segmentation and mask propagation respectively) of the complex universal video segmentation task allows each sub-module to be trained using a set of widely available training data (as opposed to smaller task-specific training datasets).

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 7 illustrates a flowchart of a series of acts in a method of performing universal segmentation to mask objects across multiple frames of a video, in accordance with one or more embodiments.

DETAILED DESCRIPTION

Figure 1:
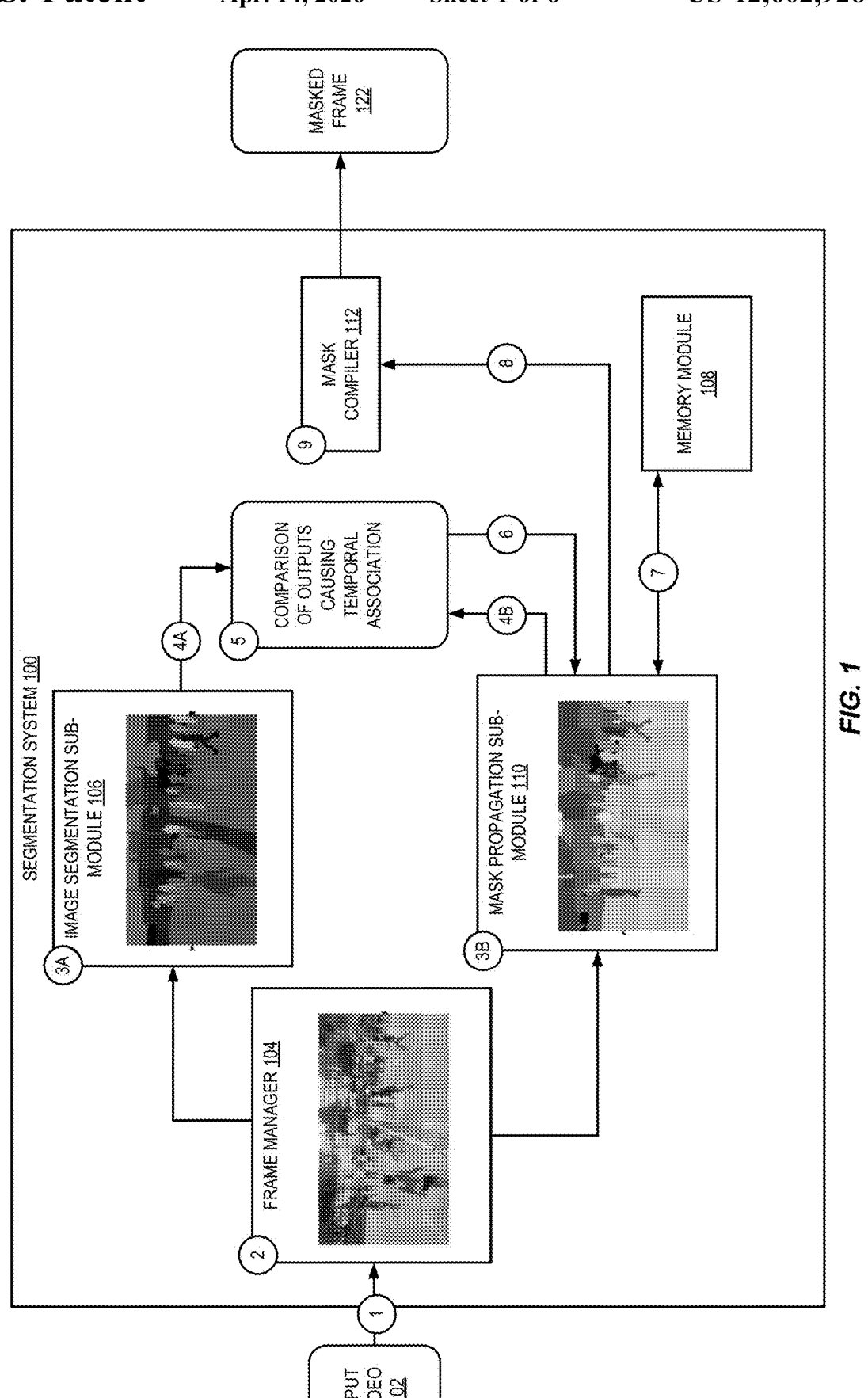
FIG. 1 illustrates a diagram of a process of performing generalized mask propagation for video segmentation using a decoupled segmentation system, in accordance with one or more embodiments.

One or more embodiments of the present disclosure include a segmentation system that combines mask propagation with image-based segmentation to determine temporally coherent masks of objects in frames of a video. In one conventional approach, segmentation systems are trained to perform specific segmentation objectives (e.g., panoptic segmentation, instance segmentation, semantic segmentation). For example, some systems perform video panoptic segmentation using a tracking-by-detection strategy by employing a multi-headed segmentation system trained in an end-to-end manner. For example, a first head of the multi-headed model detects segments, and a second head determines the temporal association of the detected segments. However, such systems are limited in performing the specific segmentation objective that the segmentation system was trained to perform. Additionally, obtaining video training data for a large number of object classes is expensive and difficult to acquire. As a result, conventional systems do not perform well on data including objects that have not been learned during training (e.g., multiple different types of objects in an image). Therefore, the practical uses of such conventional systems are limited. Some conventional approaches perform video segmentation by propagating detected segments at a first frame over time. However, such systems cannot mask new objects that are introduced in the video at a frame other than the first frame.

To address these and other deficiencies in conventional systems, the segmentation system of the present disclosure leverages two decoupled modules, including an image-based segmentation module and a video-based mask-propagation sub-module, allowing the segmentation system of the present disclosure to determine temporally coherent masks of frames of a video. The segmentation system leverages the image-based segmentation module's ability to detect objects in an image using any universal image segmentation method. The image segmentation sub-module learns the appearance of objects while remaining robust to temporal inconsistencies such as occlusion and drifting. The segmentation system leverages the video-based mask propagation sub-module to learn the temporal coherence of class-agnostic objects without depending on the deformation/shape of the object. The segmentation system capitalizes on the strengths of each independent sub-module by forcing each output of the two sub-modules to interact. Subsequently, the segmentation system updates memory of a segmented representation of each frame in the video sequence.

Additionally, decoupling each sub-module allows the segmentation system to train each sub-module more easily. For example, the segmentation system trains each module on a wider array of training data. Specifically, image segmentation training data and class agnostic video mask propagation used for training the image segmentation sub-module and mask propagation sub-module respectively are both more available and cheaper than task/class-specific video segmentation training data training end-to-end systems.

Using a decoupled segmentation system to perform video-based mask segmentation reduces computing resources that would otherwise be required to train a segmentation system to perform video-based mask segmentation. Unlike conventional methods that train an end-to-end system on a complicated task, each module of the segmentation system is trained on a simplified task that is scaled to obtain complicated results (e.g., temporally coherent masked objects in each frame of a video sequence). Additionally, because each of the tasks of the decoupled segmentation system are easier to learn, each module of the decoupled segmentation system can perform its task at a higher accuracy than conventional systems performing complicated tasks. Achieving higher accuracy masks of a video sequence reduces the likelihood of re-executing the segmentation system multiple times to obtain similar high accuracy results. Accordingly, obtaining higher accuracy mask of the video sequence conserves computing resources that would otherwise be spent to re-execute segmentation systems.

FIG. 1 illustrates a diagram of a process of performing generalized mask propagation for video segmentation using a decoupled segmentation system, in accordance with one or more embodiments. Segmented objects are propagated through each frame of a video sequence to result in a universal segmentation of the objects in the video. The segmentation system 100 segments objects of each frame using memory of the segmented objects in the previous frames of the video sequence. As described herein, an object of the frame is a representation of an object depicted in/by the frame.

At numeral 1, an input video 102 is received by the segmentation system 100. The input video 102 may be a computer-generated video, a video captured by a video recorder (or other sensor), and the like. The input video 102 includes any digital visual media including a plurality of frames which, when played, includes a moving visual representation of a story and/or an event.

At numeral 2, the frame manager 104 partitions the input video 102 into frames, where each frame of the input video 102 is an instantaneous image of the input video 102 at time t. The current frame at time t is an image depicting one or more objects of the frame. As shown, the frame at time t is passed to both the image segmentation sub-module 106 and the mask propagation sub-module 110. While the image segmentation sub-module 106 and the mask propagation sub-module 110 are shown as simultaneously receiving the frame at time t, in some embodiments, the image segmentation sub-module 106 and/or the mask propagation sub-module 110 can receive the frame at time t sequentially (e.g., the image segmentation sub-module 106 process the frame before the mask propagation sub-module 110 and vice-versa).

At numeral 3A, the image segmentation sub-module 106 performs image-based detection on the frame of the input video 102. The image segmentation sub-module 106 can perform universal image segmentation such as panoptic segmentation to segment background objects in an image and instance segmentation to segment foreground objects in the image. The image segmentation sub-module 106 performs high-level reasoning to detect or otherwise identify one or more objects in the image. Any model configured to perform image-based detection on individual frames of the input video 102 can be the image segmentation sub-module 106. For example, Mask2Former is a machine learning model that is configured to segment objects in an image using instance segmentation, panoptic segmentation, and semantic segmentation. In some embodiments, the image segmentation sub-module 106 is executed using multiple image-based detection models. In operation, the image segmentation sub-module 106 segments objects in a frame based on pixel-level detection of objects in each frame. While described as segmenting objects, in some embodiments, the image segmentation sub-module 106 segments sub-objects. At numeral 4A, the image segmentation sub-module 106 passes detected object segments to an association module (not shown) for comparison.

A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

At numeral 3B, the mask propagation sub-module 110 temporally associates object segments using any mask propagation model. Specifically, the mask propagation sub-module 110 performs pixel-level tracking to track the temporal coherence of object motion across frames. In other words, the mask propagation sub-module 110 tracks segmented objects of each frame using memory of segmented objects in previous frames. For example, the mask propagation sub-module 110 queries the memory module 108 for a representation of segmented objects in previous frames (e.g., a feature map of segmented objects in previous frames). The mask propagation sub-module 110 learns local semantics of class agnostic objects (e.g., color, texture, etc.) such that the mask propagation sub-module 110 tracks the local semantics of such class agnostic objects across the frames. For example, the XMem model is an example of the mask propagation sub-module 110 that temporally propagates masks of objects by encoding structural spatial information of objects in a frame. The mask propagation sub-module 110 uses the previous representations of segmented objects in each frame (e.g., a memory representation stored in the memory module 108) such that the mask propagation sub-module can identify when segments move (or don't move) across a series of frames over time. At numeral 4B, the mask propagation sub-module 110 passes an estimated mask of the segmented objects in the current frame to an association module (not shown) for comparison.

At numeral 5, the output of the image segmentation sub-module 106 and the mask propagation sub-module 110 are compared, causing a temporal association of the segmented objects in the current frame with respect to segmented objects in previous frames. Additional details of the comparison of outputs are discussed further at least in FIG. 3.

At numeral 6, the mask propagation sub-module 110 receives a coarse estimation of segmented objects in the current frame based on the comparison of the output of the image segmentation sub-module 106 and the mask propagation sub-module 110. The mask propagation sub-module 110 refines the coarse estimation of segmented objects, as described further at least in in FIG. 3.

At numeral 7, the mask propagation sub-module updates memory module 108 with the refined estimation of segmented objects corresponding to the current frame (or a representation of the refined estimation of segmented objects) to the memory module 108. As shown by the comparison of outputs performed at numeral 5, the output of the image segmentation sub-module 106 and the mask propagation sub-module 110 are used as signals of the segmentation system 100. Unlike conventional association-based methods (e.g., Hungarian matching) which are bounded by object segments of a current frame, the estimation of segmented objects of the current frame are passed to the memory module 108 such that they are stored and used by the mask propagation sub-module 110 for future frames of the input video 102.

At numeral 8, the mask propagation sub-module 110 passes a refined estimation of segmented objects of the current frame to the mask compiler 112. At numeral 9, the mask compiler 112 and creates masked frame 122 that is understandable by humans. For example, the mask compiler 112 may receive a probability distribution indicating a likelihood of each pixel of the frame belonging to a mask. The mask compiler 112 converts the probabilities into a mask displayed to a user. For example, the mask compiler 112 overlays a visual indicator over each pixel belonging to the mask. Such overlayed visual indicators may be colors, patterns, and the like. In some embodiments, the mask compiler 112 is a decoder that can transform a latent space representation of the current frame (e.g., a representation of the refined estimation of segmented objects) to masked frame 122.

As a result of the overlaid visual indicator(s), the masked frame 122 of the current frame masks background objects and foreground objects of the current frame. In some embodiments. The masked frame 122 is displayed for a user as an output of the segmentation system 100. In other embodiments, the masked frame 122 is communicated to one or more processing devices for subsequent processing.

Figure 2:
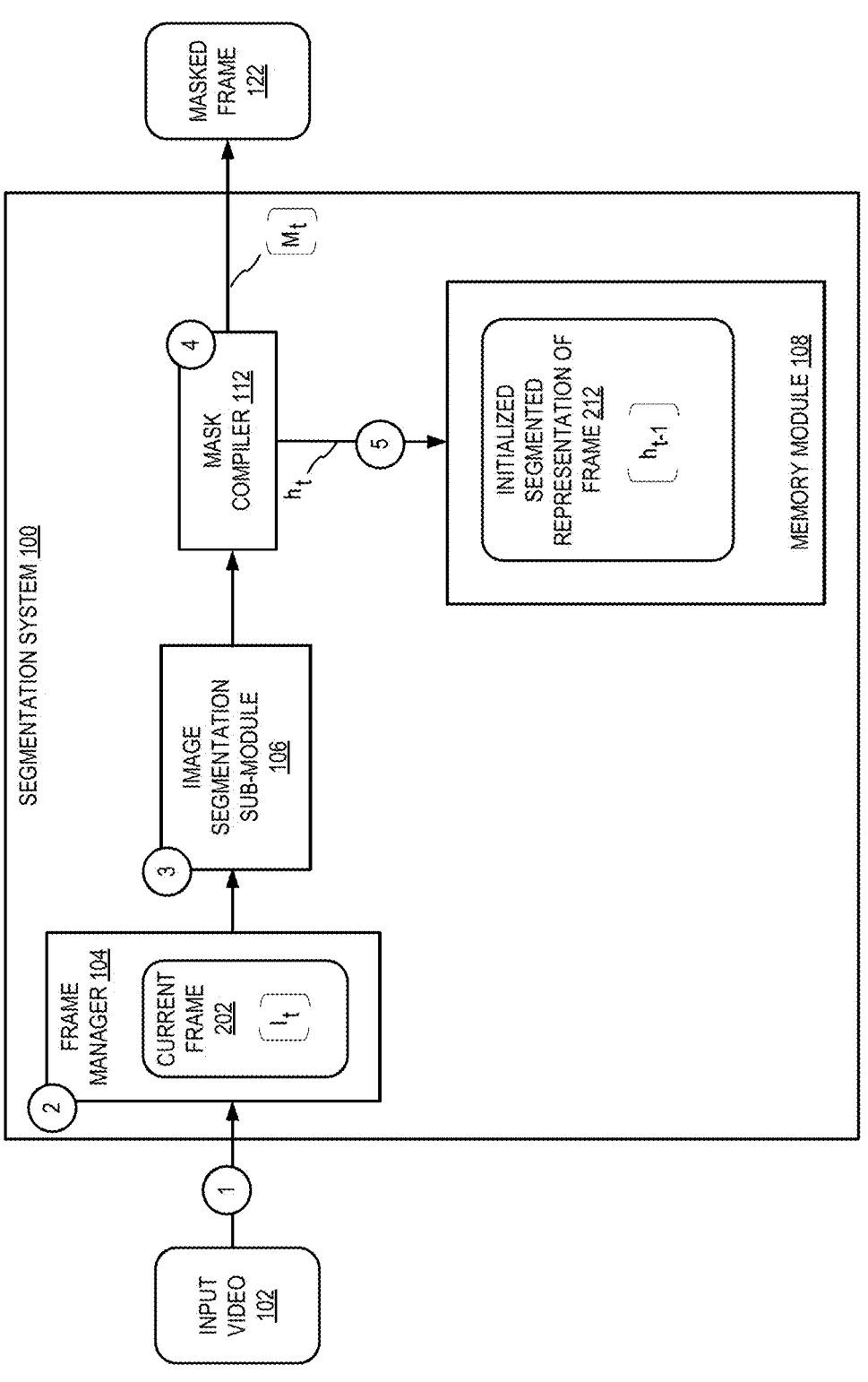
FIG. 2 illustrates a diagram of a process of performing generalized mask propagation of a first frame of a video sequence using a decoupled segmentation system, in accordance with one or more embodiments.

FIG. 2 illustrates a diagram of a process of performing generalized mask propagation of a first frame of a video sequence using a decoupled segmentation system, in accordance with one or more embodiments. At numeral 1, the input video 102 is applied to the segmentation system 100. At numeral 2, the frame manager 104 receives the input video 102 and partitions the input video 102 into frames. The input video 102 is a sequence of frames over time. As shown, current frame 202 is the frame at time t with one or more objects that is processed by the segmentation system 100. As described herein, current frame 202 at time t is also referred to as image $I_t$.

At numeral 3, the image segmentation sub-module 106 performs image-based detection of the current frame 202. As a result, one or more objects of the current frame 202 are segmented or otherwise distinguished from one or more other objects of the current frame 202. In operation, the image segmentation sub-module determines mutually exclusive segmented objects of the current frame 202 using any image-based object detection machine learning algorithm. In some embodiments, the image segmentation sub-module 106 performs image-based detection by extracting features of the frame. For example, the image segmentation sub-module 106 extracts image features, which are a low-resolution latent space representation of the current frame 202. The feature representation of the segmented frame (also referred to herein as the segmented representation of the current frame $h_t$) may be a feature map that encodes appearance and positional information of each segmented object in the current frame 202.

At numeral 4, the mask compiler 112 receives the segmented representation of the current frame (e.g., $h_t$). Because the segmented representation of the current frame is the first frame of the video sequence, the segmented representation of the current frame is an accurate representation of the segmented objects of the current frame 202. That is, there is no temporal association across frames because the time t=0. As a result, the mask compiler 112 converts the segmented representation of the current frame to masked frame 122 understandable by humans, as described herein. The masked frame 122 is output for display and/or output for downstream processing. The masked frame 122 is also referred to as $M_t$.

At numeral 5, the mask compiler 112 passes the segmented representation of the current frame to the memory module 108. In some embodiments, the image segmentation sub-module 106 passes the segmented representation of the current frame to the memory module. The memory module 108 stores the segmented representation of the current frame (e.g., $h_t$) as an initialized segmented representation of the frame 212. Because the memory module 108 stores the segmented representation of the frame for use during a next frame, the stored segmented representation of the frame is also referred to herein as $h_{t-1}$. In other words, an input frame at time t results in the segmented representation of the frame (e.g., $h_t$) being stored as a segmented representation of a previous frame (e.g., $h_{t-1}$) for processing of a frame at t+1.

Figure 3:
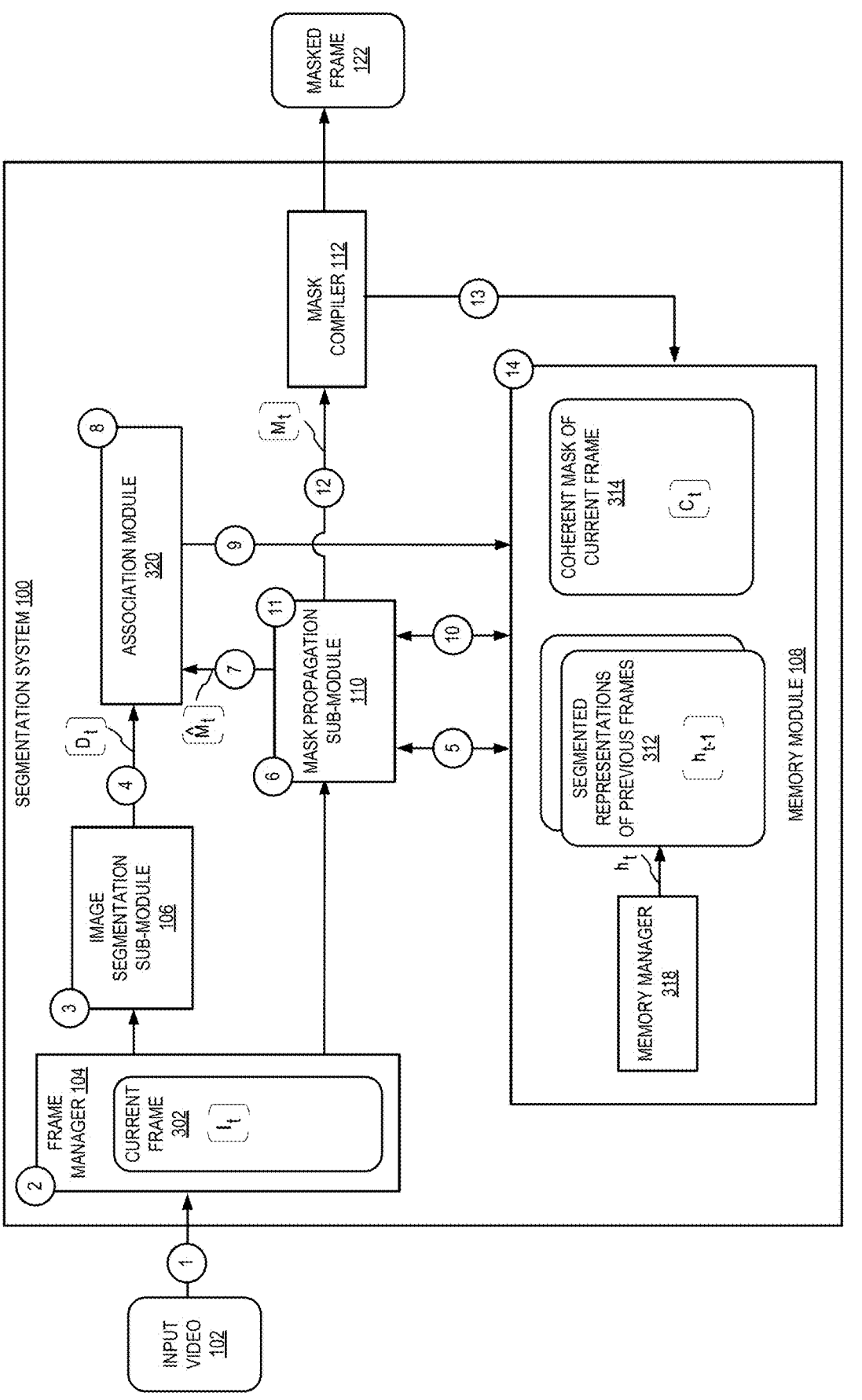
FIG. 3 illustrates a diagram of a process of performing generalized mask propagation of every k frames of a video sequence using a decoupled segmentation system, in accordance with one or more embodiment.

FIG. 3 illustrates a diagram of a process of performing generalized mask propagation of every k frames of a video sequence using a decoupled segmentation system, in accordance with one or more embodiments. At numeral 1, the input video 102 is applied to the segmentation system 100. At numeral 2, the frame manager 104 receives the input video 102 and partitions the input video 102 into frames. The input video 102 is a sequence of frames over time. As shown, current frame 302 is the frame at time t with one or more objects that is processed by the segmentation system 100. As described herein, current frame 302 at time t is also referred to as image $I_t$.

Every kth frame, the image segmentation sub-module 106 is queried to perform image-based detection of the current frame 302 at numeral 3. In some embodiments, k is a user-configurable parameter received as a user input. In some embodiments, k is predetermined. In some embodiments, k is automatically determined. For example, the memory manager 318 (described herein) sets k or otherwise queries the image segmentation sub-module to perform image-based detection of the current frame 302 responsive to determining that the current frame 302 is dissimilar to one or more previously stored frames. For example, the memory manager 318 compares one or more features/characteristics of the current frame 302 (or a representation of the current frame 302 such as a feature map of current frame or an estimated mask of segmented objects of the current frame) to a previously stored frame (e.g., the frame at t−1) and/or one or more features/characteristics of the previously stored frame/a representation of the previously stored frame to determine whether the current frame 302 is similar or dissimilar to a previous frame. In a non-limiting example, the memory manager 318 compares a location of one or more pixels of a previously stored frame to the corresponding location of the pixels in the current frame 302. If the location of one or more pixels between the previously stored frame and current frame 302 are within a threshold distance, then the memory manager 118 determines that the current frame 302 and previously stored frame are temporally related. Responsive to determining that the frames are temporally related, the memory manager 318 determines that the frames are similar and the image segmentation sub-module 106 is not queried (e.g., k is not set). The memory manager 318 may determine that the current frame 302 is dissimilar to the previous frame responsive to other similarity/dissimilarity criteria including comparing features in corresponding patches of the frame, comparing color of pixels in corresponding patches of the frame, comparing luminosity of pixels in corresponding patches of the frame, and the like.

By segmenting every k frames of the input video 102 (instead of segmenting only the first frame, like conventional systems), the image segmentation sub-module 106 segments new objects in the input video 102 and can correct previously segmented objects (e.g., due to a partial observation of an object in an earlier frame in time of the input video 102). As the value of k increases, the segmentation system 100 must identify longer-term associations of objects in the input video. In some embodiments, k is set to 3 such that the image segmentation sub-module 106 is queried every 3 frames. In response to the query, the image segmentation sub-module at numeral 3 segments objects of the current frame 302. As described herein, the image segmentation sub-module 106 segments one or more objects of the current frame 302 using any image segmentation/object detection technique.

The image segmentation sub-module determines a set of s detected object segments for the kth current frame 302 (e.g., $I_t$). The set of detected segments can be expressed mathematically according to Equation (1) below:

$$D_t = \{d_i \in \{0, 1\}^{H \times W}, 1 \leq i \leq s\} \tag{1}$$

Each time the image segmentation sub-module 106 is queried to segment objects (e.g., every k frames), the image segmentation sub-module passes the detected object segments $D_t$ of the current frame 302 to the association module 320, as indicated by numeral 4.

While the image segmentation sub-module is able to detect objects in an image, the detected objects in each frame are not correlated. For example, each detected object in a frame is independent of detected objects in subsequent/previous frames. The mask propagation sub-module 110 correlates or otherwise associates objects detected by the image segmentation sub-module 106 such that masks output by the segmentation system are temporally coherent and consistent.

At numeral 5, the mask propagation sub-module 110 queries the memory module 108 and receives one or more segmented feature representations of previous frames 312.

For example, the mask propagation sub-module 110 may receive a feature map associated with segmented objects of a previous frame segmented by the image segmentation sub-module (e.g., $h_{t−1}$).

At numeral 6, the mask propagation sub-module 110 tracks the temporal coherence of object motion using the current frame 302 and one or more segmented representations of previous frames 312. The mask propagation sub-module 110 propagates features of previous frames (e.g., using the stored feature representations of a previously segmented frame $h_{t−1}$) to the current frame 302 using the propagation operation. Mathematically, this can be represented according to Equation (2) below:

$$Prop(I_t, h_{t-1}) = \overline{M}_t = \{\overline{m}_j \in \{0, 1\}^{H \times W}, 1 \leq j \leq n_{t-1}\} \tag{2}$$

In Equation (2), $\overline{M}_t$ is the estimated mask of the segmented objects in the current frame and $n_{t−1}$ is the number of segmented objects in the previous frames. As indicated in Equation (2) above, the forward inference of masks is performed without the detected object segments of the current frame 302. That is, the mask propagation sub-module 110 does not receive the output of the image segmentation sub-module 106. Instead of propagating the detected object segments of the current frame 302, the mask propagation sub-module 110 propagates a segmented representation of previous frame $h_{t−1}$.

At numeral 7, the mask propagation sub-module 110 passes the estimated mask of the segmented objects of the current frame $\overline{M}_t$ to the association module 320. At numeral 8, the association module 320 associates the detected object segments $D_t$ of the current frame 302 (e.g., received at numeral 4 as the output from the image segmentation sub-module 106) and the estimated mask of the segmented objects of the current frame $\overline{M}_t$ (e.g., received at numeral 7 as the output from the mask propagation sub-module 110).

The association module 320 allows the segmentation system 100 to identify new objects in a frame. For example, a new object may enter a frame of the video sequence resulting in a new mask corresponding to the new object. Additionally, the association module 320 associates imperfect masks (or partial masks) of objects in a frame to identify new objects in the frame or identify objects that may have been occluded.

The association module 320 compares the output of detected object segments $D_t$ of the current frame 302 and the estimated mask of the segmented objects of the current frame $\overline{M}_t$ to consistently identity the same objects across frames of the input video 150. That is, objects that have been previously masked in prior frames are re-masked according to one or more similarities. For example, the color, pattern, luminosity, etc. of an object masked in prior frames will be the same color, pattern, luminosity, etc. of the object masked in future frames based on identifying the same object across frames. As a result, the same object appearing in frames of the video sequence over time is masked the same way, creating the temporal coherence of the masked objects. In other words, the association module 320 allows the segmentation system 100 to track objects across frames of the input video 102.

In operation, the association module 320 compares each of the object segments of the current frame 302 (e.g., $D_t$, received from the image segmentation sub-module 106) to each of the estimated masks of objects in the current frame (e.g., $\overline{M}_t$, received from the mask propagation sub-module

110) to identify newly segmented objects and/or correct previously segmented objects. The association module 320 may perform any similarity analysis to compare the similarity of the segments $D_t$ to the estimated masks of segmented objects $\widehat{M_t}$ to determine whether a segmented object in the set $D_t$ (e.g., one segmented object of the set of segmented objects of the current frame) and an estimated mask in the estimated masks $\widehat{M_t}$ (e.g., one estimated mask of the set of estimated masks of the current frame) match. The association module 320 determines that a segmented object and an estimated mask match based on a similarity of the segmented object and estimated mask satisfying a similarity threshold. In one embodiment, the association module 320 performs intersection over union to identify overlapping segmented objects/masks, where intersection over union indicates how well two segmented objects/masks match. This is expressed mathematically according to Equation (3) below.

$$(i, j) = \begin{cases} 1, & IoU(d_i, \widehat{m_j}) = > 0.5 \\ 0, & \text{otherwise} \end{cases} \quad (3)$$

where $$IoU(d_i, \widehat{m_j}) = \left| \frac{d_i \cap \widehat{m_j}}{d_i \cup \widehat{m_j}} \right|$$

In Equation (3) above, a similarity threshold of 0.5 is used to identify overlapping/matched segmented objects/masks. However, other thresholds may be used instead. Any matches of overlapping segmented objects (e.g., a match of a segmented object in the set of segmented objects $D_t$ with a match of an estimated masked object in the set of estimated masked objects $\widehat{M_t}$) indicate a unique object in current frame 302 of the input video 150. By taking the union of the overlapping/matched segmented objects, the association module 320 merges matched segmented objects in the set $D_t$ with estimated masks in the estimated masks $\widehat{M_t}$, creating a single estimated masked object from two masked/segmented objects.

In some embodiments, if detected masks in the set $D_t$ correspond to multiple masks $M_t$ of the current frame 302, the association module 320 may perform one-to-many and/or many-to-one matching to match multiple segments. This may happen, for example, when the detected masks in the set $D_t$ contain object-level masks (e.g., a person) while the mask $M_t$ (or estimated masks $\widehat{M_t}$) include part-level masks of the object (e.g., a hand of the person, the head of the person, etc.). In one-to-many matching, the association module 320 matches the object-level masks to all of its corresponding part-level masks. In many-to-one matching, the association module 320 matches all of the part-level masks to the corresponding object-level masks. The association module 320 may perform such one-to-many and/or many-to-one matching by comparing every potential pair using a mask intersection metric. Example mask intersection metrics include:

$$\frac{d_i \cap \widehat{m_j}}{\max(|d_i|, |\widehat{m_j}|)}, \frac{d_i \cap \widehat{m_j}}{|d_i|}, \frac{d_i \cap \widehat{m_j}}{|\widehat{m_j}|}, \frac{d_i \cap \widehat{m_j}}{\min(|d_i|, |\widehat{m_j}|)},$$

and the like. If the mask intersection metric is above a threshold, the association module 320 matches the part-level mask/object-level mask.

As indicated in Equation (3) above, some masks and segments will not overlap. The association module 320 identifies unmatched segment $d_i$ as new objects in current frame 302 of input video 102. The association module 320 can also identify partial objects based on unmatched propagated masks. The unmatched segments and unmatched propagated masks indicate that a new object has entered the video at the current frame or otherwise becomes visible to a user. As described herein, the image segmentation sub-module 106 and mask propagation sub-module 110 each have different strengths at detecting objects in a frame. Therefore, in some embodiments, the image segmentation sub-module 106/the mask propagation sub-module 110 will detect objects undetected by the mask propagation sub-module 110/the image segmentation sub-module 106 respectively.

The matched masks/segments, unmatched segments $d_i$ and unmatched propagated masks $\widehat{m_j}$ are merged, by the association module 320, into a coherent mask of the current frame $C_t$. That is, the matched masks/segments from the segmented objects in the set $D_t$ and the estimated masks in the estimated masks $\widehat{M_t}$ are included as a single merged mask in the coherent mask, and each of the unmatched segments $d_i$ and unmatched propagated masks $\widehat{m_j}$ (from the segmented objects in the set $D_t$ and the estimated masks in the estimated masks $\widehat{M_t}$) are added or otherwise included as masks in the coherent mask. The coherent mask $C_t$ can be expressed mathematically according to Equation (4) below.

$$C_t = \begin{cases} \widehat{m_j} \cup \{d_i | \text{Match}(i, j) = 1, & 1 < j < n_{t-1} \\ d_j, & n_{t-1} < j < n_t \end{cases} \quad (4)$$

In Equation (4) above, $n_t$ is the number of segmented objects from the last frame $(n_{t-1})$ plus the number of new segmented objects (e.g., unmatched segments $d_i$). It should be appreciated that the coherent mask $C_t$ may not include mutually exclusive segmented objects. For example, pixels of the current frame 302 may be determined to belong to multiple objects. In the event the same pixel is associated with multiple objects, the smaller object is assigned the pixel to prevent ignoring the smaller object.

In some embodiments, the association module 320 assigns identifiers to the matched masks/segments in the coherent mask. In this manner, the association module 320 tracks objects in frames over time and allows the segmentation system 100 to consistently identify/mask the same object in frames over time. One type of identifier that may be utilized by the association module 320 is an object category. For example, in some embodiments, the image segmentation sub-module and/or mask propagation sub-module may classify an object in the current frame 302 (or a mask of an object in the current frame 302). For example, the object/mask of the object may be classified as a car, a person, and the like. The classification of the object (e.g., the object category) may be stored and/or passed to the association module 320 as an identifier. If masks/segments associated with multiple identifiers are merged in the coherent mask, the association module 320 may perform a voting scheme to determine the identifier associated with the merged masks/segments. For example, the association module 320 uses the object categories and majority voting to assign an identifier to the merged masks/segments.

In an embodiment, an identifier associated with the matched mask/segment is associated with the same color or other visual identifier in each frame over time. Using the identifiers associated with the matched masks/segments, an object is visually represented the same across frames and is distinct from other objects in the frame.

At numeral 9, the association module passes the coherent mask $C_t$ to the memory module 108 to be stored by the memory module 108 as the coherent mask of the current frame 314. By propagating the coherent mask to the memory module 108, the memory module 108 stores information related to unmatched and/or partially matched segments $d_i/$ $\widetilde{m}_j$ associated with the current frame 102.

At numeral 10, the mask propagation sub-module 110 queries the memory module 108 and receives the coherent mask of the current frame 314 (e.g., $C_t$). In some embodiments, the mask propagation sub-module 110 queries the association module 320 for the coherent mask of the current frame 314. In some embodiments, the mask propagation sub-module 110 queries the memory module 108 for the segmented representation of the previous frame (e.g., $h_{t-1}$).

At numeral 11, the mask propagation sub-module 110 self-propagates the coherent mask of the current frame to generate a refined mask of the current frame 302. Refining the coherent mask by propagating the coherent mask through the mask propagation sub-module corrects for segmentation errors as a result of the merged segmented objects. For example, as described above, the coherent mask may include one or more segmented objects sharing the same pixel of the current frame 302. The mask propagation sub-module determines a refined mask $M_t$ of the current frame 302 at time t according to Equations (5)-(6) below.

$$\widetilde{h}_t = \text{Update}(I_t, C_t, h_{t-1}) \qquad (5)$$

$$M_t = Prop(I_t, \widetilde{h}_t) \qquad (6)$$

As indicated in Equations (5)-(6) above, the mask propagation sub-module determines the estimated segmented representation of the current frame $\widetilde{h}_t$ using the coherent mask $C_t$, the current frame $I_t$, and the segmented representation of the previous frame $h_{t-1}$. Then, the mask propagation sub-module 110 propagates the estimated segmented representation of the current frame (e.g., $\widetilde{h}_t$), which is based on the coherent mask and features of previous frames, to the current frame 302. As a result, the mask propagation sub-module 110 generates a refined mask $M_t$ of the current frame 302 based on the spatial and/or positional information learned from the segmented representations of previous $h_{t-1}$ (e.g., a feature map of a previous frame).

At numeral 12, the mask compiler 112 receives the mask $M_t$ from the mask propagation sub-module 110. The mask compiler 112 converts the mask to masked frame 122 understandable by humans, as described herein. The masked frame 122 is output from the segmentation system 100 for display to a user and/or output for subsequent processing.

At numeral 13, the mask compiler 112 passes the mask $M_t$ to the memory module 108. At numeral 14, a memory manager 318 of the memory module 108 updates the segmented representation of previous frames (e.g., $h_{t-1}$). After every current frame 302 is processed (e.g., a frame at time t), the memory manager 318 updates the segmented representation of the current frame (e.g., $h_t$). Mathematically, this can be represented according to Equation (7) below:

$$h_t = \text{Update}(I_t, M_t, h_{t-1}) \qquad (7)$$

As indicated in Equation (7) above, the memory manager 318 determines the segmented representation of the current frame 302 (e.g., $h_t$) using the current frame 302 at time t (e.g., $I_t$), the mask $M_t$, and the segmented representation of a previous mask $h_{t-1}$. In some embodiments, the memory manager 318 obtains the current frame 302 at time t (e.g., $I_t$) from the mask propagation sub-module 110 (e.g., either at numeral 5 or numeral 10). In other embodiments, the memory manager 318 queries the frame manager 104 for the current frame 302. Because the memory module 108 stores the segmented representation of the current frame (e.g., $h_t$) for use during a next frame (e.g., at a time t+1), the stored representation of the frame is represented as $h_{t-1}$. In other words, an input frame at time t results in the segmented representation of the current frame (e.g., $h_t$) becoming a segmented representation of a previous frame (e.g., $h_{t-1}$) for use with an input frame at time t+1. Storing the segmented representation of a previous frame as $h_{t-1}$ stores features of the appearance and position of objects in the current frame 302.

In some embodiments, the memory manager 318 algorithmically combines (e.g., averages, etc.) one or more segmented representations of previous frames. In other embodiments, the memory module 308 maintains a number of segmented representations of previous frames. For example, the memory module 308 stores N most recent segmented representations of previous frames. In other embodiments, the memory manager 318 accumulates and stores every segmented representation of previous frames.

Figure 4:
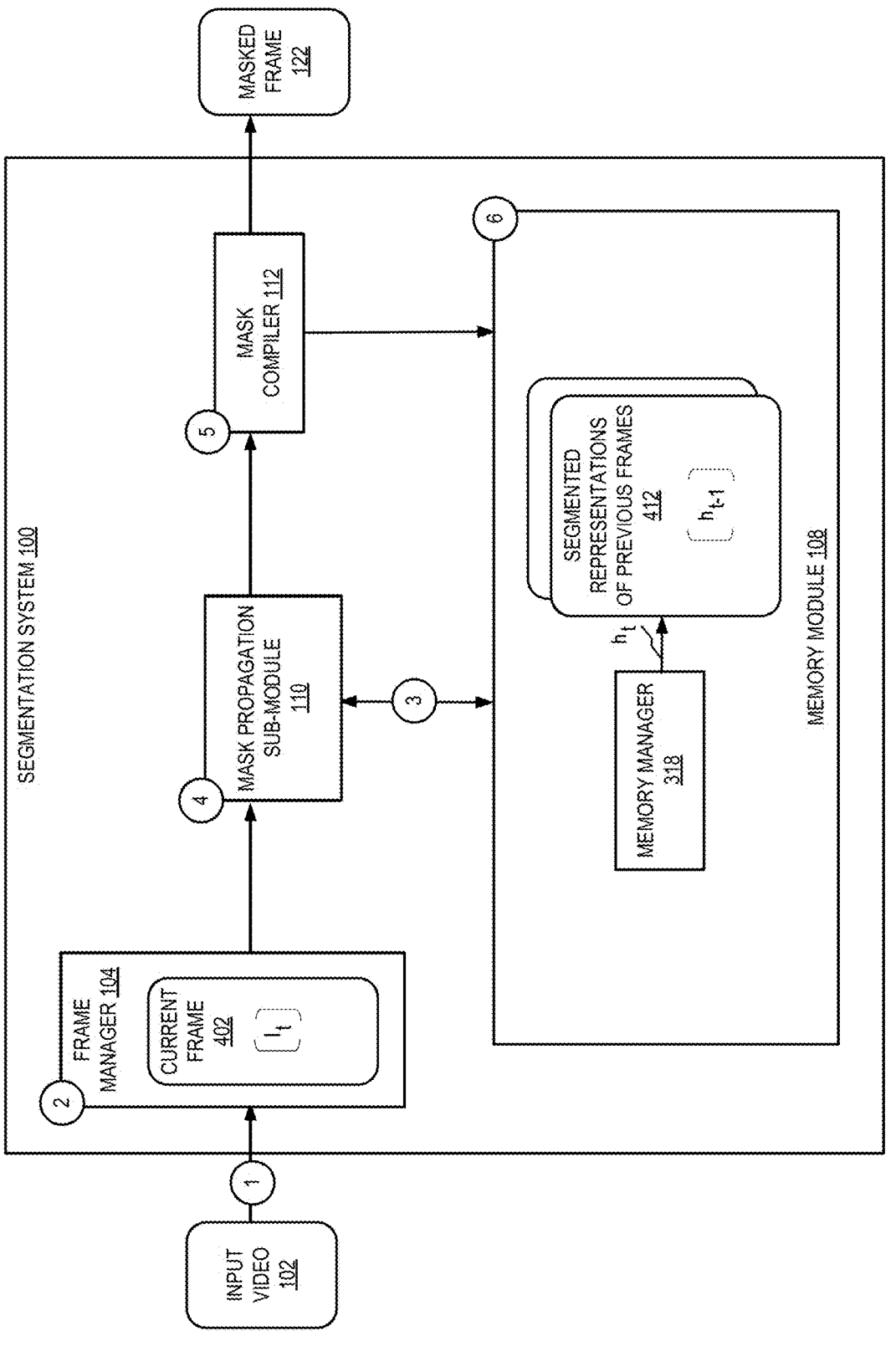
FIG. 4 illustrates a diagram of a process of performing generalized mask propagation for k−1 frames between every kth frame of a video sequence using a decoupled segmentation system, in accordance with one or more embodiments.

FIG. 4 illustrates a diagram of a process of performing generalized mask propagation for k−1 frames between every kth frame of a video sequence using a decoupled segmentation system, in accordance with one or more embodiments. As described herein, k may be a user configurable parameter, predetermined, or automatically determined. If k=1, then the diagram of the process of FIG. 4 is not performed because the image segmentation sub-module is queried every frame. If k greater than 1, then the diagram of the process of FIG. 4 is performed.

At numeral 1, the input video 102 is applied to the segmentation system 100. At numeral 2, the frame manager 104 receives the input video 102 and partitions the input video 102 into frames. The input video 102 is a sequence of frames over time, where each frame of the input video 102 includes one or more objects. As shown, current frame 402 is the frame at time t that is processed by the segmentation system 100. As described herein, current frame 402 at time t is also referred to as image $I_t$.

At numeral 3, the mask propagation sub-module 110 queries the memory module 108 and receives one or more segmented representations of previous frames 412. For example, the mask propagation sub-module 110 may receive a stored segmented representation of previous frame $h_{t-1}$. As described herein, a stored segmented representation of a previous frame 412 may be an image feature map of a first frame at time t=0 as described with reference to FIG. 2. Additionally or alternatively, the stored segmented representation of a previous frame 412 may be an output determined by the mask propagation sub-module 110 (e.g., a representation of the refined masked frame as described with reference to FIG. 3 or a representation of the masked frame determined without an output from the image segmentation sub-module, as described below).

At numeral 4, the mask propagation sub-module 110 determines a mask $M_t$ without the output determined from the image segmentation sub-module 106. Instead, the mask propagation sub-module determines a mask of the current frame 402 using memorized features from past frames. The mask propagation sub-module 110 self-propagates the spatial and/or positional information (encoded in the stored segmented representation of previous frame $h_{t-1}$) to objects in the current frame 402. Mathematically, this is representing according to Equation (8) below:

$$M_t = Prop\,(I_t, h_{t-1}) \qquad (8)$$

As a result, the mask propagation sub-module 110 is able to determine a masked representation $M_t$ of the current frame 402 without an input from the image segmentation sub-module 106.

At numeral 5, the mask compiler 112 receives the mask $M_t$ from the mask propagation sub-module 110. The mask compiler 112 converts the mask to masked frame 122 understandable by humans, as described herein. The masked frame 122 is output from the segmentation system 100 for display to a user and/or subsequent processing.

At numeral 6, a memory manager 318 of the memory module 108 updates segmented representation of the current frame (e.g., $h_t$) using the mask $M_t$. After every current frame 402 is processed, the segmented representation of the frame is stored. Mathematically, this is described according to Equation (7) above. In some embodiments, the memory manager 318 obtains the current frame 402 at time t (e.g., $I_t$) from the mask propagation sub-module 110 (e.g., at numeral 3). In other embodiments, the memory manager 318 queries the frame manager 104 for the current frame 402. As described herein, because the memory module 108 stores the representation of the current frame 402 (e.g., $h_t$) for use during a next frame (e.g., at a time t+1), the stored internal feature memory representation of the frame is represented as $h_{t-1}$.

Figure 5:
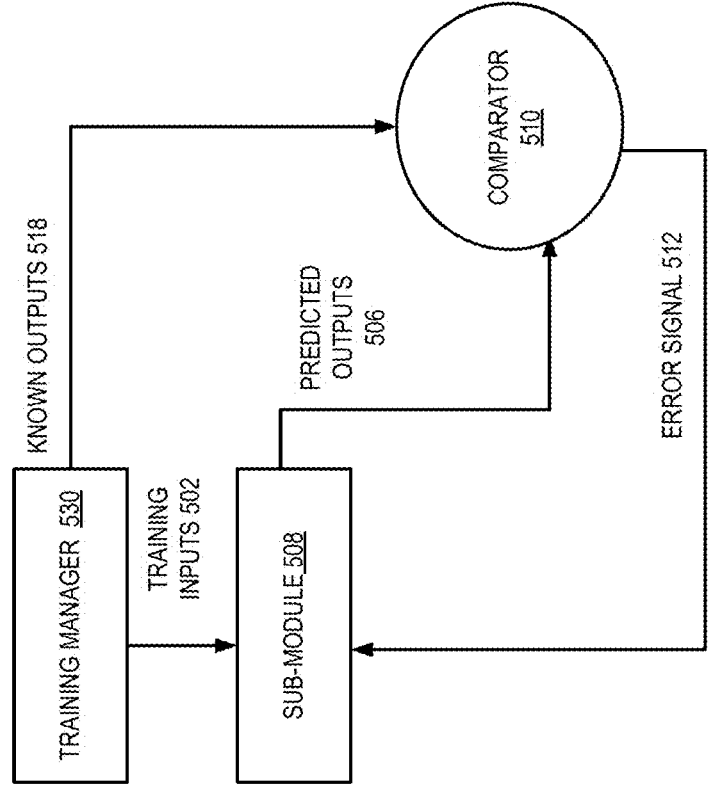
FIG. 5 illustrates an example process of supervised learning used to train a sub-module of the segmentation system, in accordance with one or more embodiments.

FIG. 5 illustrates an example process of supervised learning used to train a sub-module of the segmentation system, in accordance with one or more embodiments. As described herein, each sub-module of the decoupled segmentation system is independent. Accordingly, the training manager 530 trains the image segmentation sub-module 106 and the mask propagation sub-module 110 independently. As shown, "sub-module" 508 represents the training of either the image segmentation sub-module 106 or the mask propagation sub-module. The loss determined while training the image segmentation sub-module 106 is not propagated back to the mask propagation sub-module 110. Similarly, the loss determined while training the mask propagation sub-module 110 is not propagated back to the image segmentation sub-module 106. In other words, the loss of the image segmentation sub-module 106 is independent of the loss of the mask-propagation sub-module and the loss of the mask-propagation sub-module 110 is independent of the loss of the image segmentation sub-module.

In some embodiments, the image segmentation sub-module 106 and the mask propagation sub-module 110 are pretrained. In other embodiments, the training manager 530 trains the image segmentation sub-module 106 and the mask propagation sub-module 110 using supervised learning.

Supervised learning is a method of training a machine learning model given input-output pairs. An input-output pair is an input with an associated known output (e.g., an expected output, a labeled output, a ground truth). The sub-modules 508 are trained on known input-output pairs such that the sub-module 508 can learn how to predict known outputs given known inputs. For example, a training input 502 into the image segmentation sub-module (e.g., sub-module 508) may be an image including one or more objects (background objects or foreground objects). The corresponding known output 518 is a mask of the one or more objects of the image. Similarly, a training input 502 into the mask propagation sub-module (e.g., sub-module 508) may be a video including one or more objects. The corresponding known output 518 is a mask of the one or more objects of the video. The training inputs 502 may be obtained from a data store, an upstream process, and the like. Once the sub-module 508 has learned to predict known input-output pairs, the sub-module 508 can operate on unknown inputs to predict an output.

Generally, the sub-module 508 uses the training inputs 502 to predict outputs 506 by applying the current state of the sub-module 508 to the training inputs 502. The comparator 510 may compare the predicted outputs 506 to the known outputs 518 to determine an amount of error or differences.

The error (represented by error signal 512) determined by the comparator 510 may be used to adjust the weights in the sub-module 508 such that the sub-module 508 changes (or learns) over time to generate a relatively accurate predicted output 506 using the input-output pairs. The sub-module 508 may be trained using the backpropagation algorithm, for instance. The backpropagation algorithm operates by propagating the error signal 512. The error signal 512 may be calculated each iteration (e.g., each pair of training inputs 502 and associated known outputs 518), batch, and/or epoch and propagated through all of the algorithmic weights in the sub-module 508 such that the algorithmic weights adapt based on the amount of error. The error is minimized using a loss function. Non-limiting examples of loss functions may include the square error function, the room mean square error function, and/or the cross entropy error function.

The weighting coefficients of the sub-module 508 may be tuned to reduce the amount of error thereby minimizing the differences between (or otherwise converging) the predicted output 506 and the known output 518. The sub-module 508 may be trained until the error determined at the comparator 510 is within a certain threshold (or a threshold number of batches, epochs, or iterations have been reached). The trained sub-module 508 and associated weighting coefficients may subsequently be stored in memory or other data repository (e.g., a database) such that the sub-module 508 may be employed on unknown data (e.g., not training inputs 502). Once trained and validated, the sub-module 508 may be employed during testing (or an inference phase).

The training manager 530 can use supervised learning to train the image segmentation sub-module 106 (e.g., sub-module 508) to perform any image segmentation task using any training image dataset (e.g., known input-output pairs). In some embodiments, the training manager 530 trains the image segmentation sub-module 106 to perform multiple tasks using multiple training image datasets. In some embodiments, the training manager 530 trains the image segmentation sub-module 106 to perform one task such as a panoptic segmentation task. In other embodiments, the image segmentation sub-module 106 is a multi-headed model where each head is trained to perform a different image segmentation task. For example, the training manager 530 trains a first head of the image segmentation sub-module 106 on a panoptic segmentation task using one or more panoptic segmentation datasets. As a result, the image segmentation sub-module 106 learns to perform panoptic segmentation tasks. Similarly, the training manager 530 trains a second head of the image segmentation sub-module 106 on an instance segmentation task using one or more instance segmentation datasets. As a result, the image segmentation sub-module 106 learns to perform instance segmentation tasks. In this manner, the image segmentation sub-module 106 can perform multiple types of image segmentation tasks (e.g., panoptic segmentation, instance segmentation, semantic segmentation, etc.) by training multiple heads on multiple types of image segmentation datasets.

The training manager 530 can use supervised learning to train the mask propagation sub-module 110 (e.g., sub-module 508) using any video mask propagation dataset (e.g., known input-output pairs). For example, the training manager 530 can train the mask propagation sub-module 110 using class-agnostic labels of segmented objects across frames of a video. For example, a tree in a video mask propagation dataset may be labeled "object 1" and each instance of the tree, as it appears across the sequence of video frames, is segmented. As a result, the mask propagation sub-module 110 learns the semantics of the object as it appears in frames of the video over time.

In some embodiments, the training manager 530 trains the mask propagation sub-module 110 to be class agnostic using a class agnostic video mask propagation dataset. Training the mask propagation sub-module to be class agnostic broadens the capability of the segmentation system to segment objects that have not been learned during training. Because the mask propagation sub-module 110 is class agnostic, the accuracy of the mask propagation sub-module does not depend on learning ground truth labels of objects.

Figure 6:
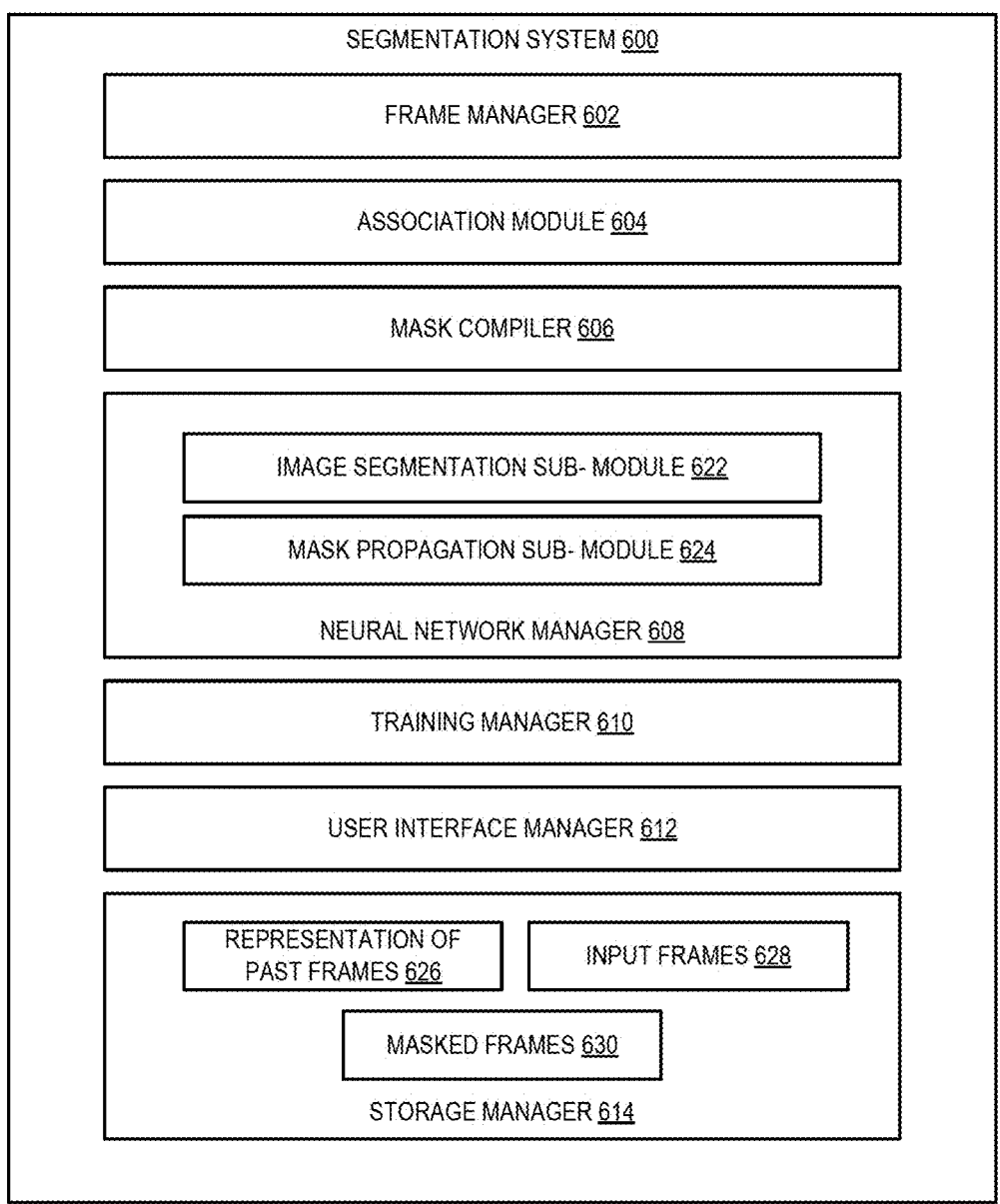
FIG. 6 illustrates a schematic diagram of segmentation system in accordance with one or more embodiments.

FIG. 6 illustrates a schematic diagram of segmentation system (e.g., "segmentation system" described above) in accordance with one or more embodiments. As shown, the segmentation system 600 may include, but is not limited to, a frame manager 602, an association module 604, a mask compiler 606, a neural network manager 608, a training manager 610, a user interface manager 612, and a storage manager 614. The neural network manager includes an image segmentation sub-module 622 and a mask propagation sub-module 624. The storage manager 614 includes a representation of past frames 626.

As illustrated in FIG. 6, the segmentation system 600 includes a frame manager 602. The frame manager 602 includes elements configured to partition a video input into frames, where each frame is an instantaneous image of the video. The frame manager 602 passes a current frame of the video to both the image segmentation sub-module 622 and the mask propagation sub-module 624.

As illustrated in FIG. 6, the segmentation system 600 includes an association module 604. The association module 604 associates the detected object segments of a current frame (e.g., received as the output from the image segmentation sub-module 622) and the estimated mask of the segmented objects of the current frame (e.g., received as the output from the mask propagation sub-module 624). The association module 604 compares the output of detected object segments of the current frame and the estimated mask of the segmented objects of the current frame to consistently identity the same objects across frames of the input video. The association module 604 may perform any similarity analysis to compare the similarity of the segments to the estimated masks of segmented objects to determine whether a segmented object in the set (e.g., one segmented object of the set of segmented objects of the current frame) and an estimated mask in the estimated masks (e.g., one estimated mask of the set of estimated masks of the current frame) match. In one embodiment, the association module 604 performs intersection over union to identify overlapping segmented objects/masks, where intersection over union indicates how well two segmented objects/masks match.

Any matches of overlapping segmented objects (e.g., a match of a segmented object in the set of segmented objects with a match of an estimated masked object in the set of estimated masked objects) indicate a unique object in current frame of the input video. By taking the union of the overlapping/matched segmented objects, the association module merges matched segmented objects in the set with estimated masks in the estimated masks, creating a single estimated masked object from two masked/segmented objects. The association module 604 can also identify partial objects based on unmatched propagated masks. The unmatched segments and unmatched propagated masks indicate that a new object has entered the video at the current frame or otherwise becomes visible to a user.

As illustrated in FIG. 6, the segmentation system 600 includes a mask compiler 606. The mask compiler 606 includes elements configured to visually identify segmented objects in each frame of the video by masking the segmented objects. For example, the mask compiler 606 overlays one or more visual indicators over the segmented objects of the frame to mask them. In some embodiments, the mask compiler 606 includes a decoder. As described herein, the mask compiler 606 may receive, from the mask propagation sub-module 624, a representation of each segmented object in a frame, based on the masked objects of past frames and the estimated masked objects of the current frame. The mask compiler 606 converts the representation of segmented objects of an image to a frame including masked objects.

As illustrated in FIG. 6, the segmentation system 600 includes a neural network manager 608. Neural network manager 608 may host a plurality of neural networks or other machine learning models, such as image segmentation sub-module 622 and mask propagation sub-module 624. The neural network manager 608 may include an execution environment, libraries, and/or any other data needed to execute the machine learning models. In some embodiments, the neural network manager 608 may be associated with dedicated software and/or hardware resources to execute the machine learning models.

As shown, the neural network manager 608 hosts the image segmentation sub-module 622. The image segmentation sub-module 622 is any one oy more image-based detection model that segments objects in an image. For example, the image segmentation sub-module 622 can be a Mask2Former machine learning model trained to segment objects in an image using instance segmentation, panoptic segmentation, and semantic segmentation. In operation, the image segmentation sub-module 622 learns the appearance of objects in a frame based on pixel-level detection of objects in each frame.

The neural network manager 608 also hosts the mask propagation sub-module 624. The mask propagation sub-module 624 temporally associates object segments using any mask propagation model. For example, the XMem model is an example of the mask propagation sub-module that temporally propagates masks of objects by encoding structural spatial information of objects in a frame. Specifically, the mask propagation sub-module 624 performs pixel-level tracking to track the temporal coherence of object motion across frames. The mask propagation sub-module 624 updates storage manager 614 with a representation of segmented objects in each frame. As a result, the storage manager 614 stores the representations of past frames 626. The mask propagation sub-module 624 uses the previous representations of segmented objects in each frame (e.g., obtained from the storage manager 614 as the representations of past frames 626) such that the mask propagation sub-module can identify when segments move (or don't move) across a series of frames over time.

Although depicted in FIG. 6 as being hosted by a single neural network manager 608, in various embodiments the neural networks may be hosted in multiple neural network managers and/or as part of different components. For example, the image segmentation sub-module 622 and the mask propagation sub-module 624 can be hosted by their own neural network manager, or other host environment, in which the respective neural networks execute, or the image segmentation sub-module 622 and the mask propagation sub-module 624 may be spread across multiple neural network managers depending on, e.g., the resource requirements of each machine learning model, etc.

As illustrated in FIG. 6, the segmentation system 600 includes a training manager 610. The training manager 610 can teach, guide, tune, and/or train one or more neural networks. For example, the training manager 610 can use supervised learning to train the image segmentation sub-module 622 to perform any image segmentation task using any training image dataset (e.g., known input-output pairs). The training manager 610 can also use supervised learning to train the mask propagation sub-module 624 using any video mask propagation dataset (e.g., known input-output pairs). For example, the training manager 610 can train the mask propagation sub-module 624 using class-agnostic labels of segmented objects across frames of a video. In particular, the training manager 610 can train a neural network based on a plurality of training data, as described in FIG. 5 above.

As illustrated in FIG. 6, the segmentation system 600 includes a user interface manager 612. The user interface manager 612 allows users to provide input videos to the segmentation system 600. In some embodiments, the user interface manager 612 provides a user interface through which the user can upload the input video which is segmented, as discussed above. Alternatively, or additionally, the user interface may enable the user to download the videos from a local or remote storage location (e.g., by providing an address (e.g., a URL or other endpoint) associated with an image source). In some embodiments, the user interface can enable a user to link an image capture device, such as a camera or other hardware to capture video data and provide it to the segmentation system 600. Additionally, the user interface manager 612 allows users to request the segmentation system 600 to mask each object appearing in a frame of the video. In some embodiments, the user interface manager 612 enables the user to view the resulting output masked video and/or request provide the masked video for downstream processing. For example, the user can remove a masked object, select a masked object, and the like.

As illustrated in FIG. 6, the segmentation system 600 includes a storage manager 614. The storage manager 614 maintains data for the segmentation system 600. The storage manager 614 can maintain data of any type, size, or kind as necessary to perform the functions of the segmentation system 600. The storage manager 614, as shown in FIG. 6, includes the representation of past frames 626. As described herein, each time the segmentation system 600 process a frame of the input video, a representation of the frame as stored such that the representation of the frame can be used during processing of a next frame of the video. A stored representation of past frames 626 may be an image feature map of a first frame at time t=0 as described with reference to FIG. 2. Additionally or alternatively, the representation of past frames 626 may be an output determined by the mask propagation sub-module 110 (e.g., a representation of the refined masked frame as described with reference to FIG. 3 or a representation of the masked frame determined without an output from the image segmentation sub-module, as described with reference to FIG. 4). The storage manager 614 also stores additional frames such as input frames 628 (e.g., a frame at each time t) and output masked frames 630 such as the masked frames determined by the mask compiler as described with reference to FIG. 1.

Each of the components 602-614 of the segmentation system 600 and their corresponding elements (e.g., elements 622-624) may be in communication with one another using any suitable communication technologies. It will be recognized that although components 602-614 and their corresponding elements are shown to be separate in FIG. 6, any of components 602-614 and their corresponding elements may be combined into fewer components, such as into a single facility or module, divided into more components, or configured into different components as may serve a particular embodiment.

The components 602-614 and their corresponding elements can comprise software, hardware, or both. For example, the components 602-614 and their corresponding elements can comprise one or more instructions stored on a computer-readable storage medium and executable by processors of one or more computing devices. When executed by the one or more processors, the computer-executable instructions of the segmentation system 600 can cause a client device and/or a server device to perform the methods described herein. Alternatively, the components 602-614 and their corresponding elements can comprise hardware, such as a special purpose processing device to perform a certain function or group of functions. Additionally, the components 602-614 and their corresponding elements can comprise a combination of computer-executable instructions and hardware.

Furthermore, the components 602-614 of the segmentation system 600 may, for example, be implemented as one or more stand-alone applications, as one or more modules of an application, as one or more plug-ins, as one or more library functions or functions that may be called by other applications, and/or as a cloud-computing model. Thus, the components '602-614 of the segmentation system 600 may be implemented as a stand-alone application, such as a desktop or mobile application. Furthermore, the components 602-614 of the segmentation system 600 may be implemented as one or more web-based applications hosted on a remote server. Alternatively, or additionally, the components of the segmentation system 600 may be implemented in a suite of mobile device applications or "apps." To illustrate, the components of the segmentation system 600 may be implemented as part of an application, or suite of applications, including but not limited to ADOBE CREATIVE CLOUD, ADOBE PHOTOSHOP, ADOBE ACROBAT, ADOBE ILLUSTRATOR, ADOBE LIGHTROOM and ADOBE INDESIGN. "ADOBE", "CREATIVE CLOUD," "PHOTO-SHOP," "ACROBAT," "ILLUSTRATOR," "LIGHT- ROOM," and "INDESIGN" are either registered trademarks or trademarks of Adobe Inc. in the United States and/or other countries.

As shown, the segmentation system 600 can be implemented as a single system. In other embodiments, the segmentation system 600 can be implemented in whole, or in part, across multiple systems. For example, one or more functions of the segmentation system 600 can be performed by one or more servers, and one or more functions of the segmentation system 600 can be performed by one or more client devices. The one or more servers and/or one or more client devices may generate, store, receive, and transmit any type of data used by the segmentation system 600, as described herein.

In one implementation, the one or more client devices can include or implement at least a portion of the segmentation system 600. In other implementations, the one or more servers can include or implement at least a portion of the segmentation system 600. For instance, the segmentation system 600 can include an application running on the one or more servers or a portion of the segmentation system 600 can be downloaded from the one or more servers. Additionally or alternatively, the segmentation system 600 can include a web hosting application that allows the client device(s) to interact with content hosted at the one or more server(s).

For example, upon a client device accessing a webpage or other web application hosted at the one or more servers, in one or more embodiments, the one or more servers can provide access to a user interface displayed at a client device. The client device can prompt a user for a video. Upon receiving the video, the client device can provide the video to the one or more servers, which can automatically perform the methods and processes described herein to segment objects in frames, masking the objects of the video. The one or more servers can then provide access to the user interface displayed at the client device with segmented objects of the video.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 8. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 8.

The server(s) may include one or more hardware servers (e.g., hosts), each with its own computing resources (e.g., processors, memory, disk space, networking bandwidth, etc.) which may be securely divided between multiple customers (e.g. client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 8.

FIGS. 1-6, the corresponding text, and the examples, provide a number of different systems and devices that allows a user to perform universal segmentation of a video.

In addition to the foregoing, embodiments can also be described in terms of flowcharts comprising acts and steps in a method for accomplishing a particular result. For example, FIG. 7 illustrates a flowchart of an exemplary method in accordance with one or more embodiments. The method described in relation to FIG. 7 may be performed with fewer or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart 700 of a series of acts in a method of performing universal segmentation to mask objects across multiple frames of a video, in accordance with one or more embodiments. In one or more embodiments, the method 700 is performed in a digital medium environment that includes the segmentation system 600. The method 700 is intended to be illustrative of one or more methods in accordance with the present disclosure and is not intended to limit potential embodiments. Alternative embodiments can include additional, fewer, or different steps than those articulated in FIG. 7.

As illustrated in FIG. 7, the method 700 includes an act 702 of determining an image segmentation mask which masks an object of a frame of a video sequence using the frame and an image segmentation module of a segmentation system. As described herein, a video sequence includes multiple frames. The image segmentation sub-module segments a current frame. For example, the image segmentation sub-module performs universal image segmentation such as panoptic segmentation to segment background objects in an image and instance segmentation to segment foreground objects in the image. The image segmentation sub-module performs high-level reasoning to detect or otherwise identify one or more objects in the image. In one embodiment, the image segmentation sub-module is a Mask2Former machine learning model.

As illustrated in FIG. 7, the method 700 includes an act 704 of determining a mask propagation mask which masks the object of the frame of the video sequence using the frame, a representation of a previous frame of the video sequence, and a mask propagation module of the segmentation system. The mask propagation sub-module tracks the temporal coherence of object motion using the current frame and one or more segmented representations of previous frames. For example, a mask propagation sub-module temporally associates object segments of frames over time. In operation, the mask propagation sub-module performs pixel-level tracking to track the temporal coherence of object motion across frames. In other words, the mask propagation sub-module tracks segmented objects of each frame using memory of segmented objects in previous frames. In one embodiment, the mask propagation sub-module is a XMem machine learning model.

As illustrated in FIG. 7, the method 700 includes an act 706 of determining a frame mask which masks the object of the frame of the video sequence based on a comparison of the image segmentation mask and the mask propagation mask. As described herein, an association module associates the detected object segments $D_t$ of the current frame (e.g., received as the output from the image segmentation sub-module) and the estimated mask of the segmented objects of the current frame $\widehat{M_t}$ (e.g., received as the output from the mask propagation sub-module). The association module compares the output of detected object segments $D_t$ of the current frame and the estimated mask of the segmented objects of the current frame $\widehat{M_t}$ to consistently identity the same objects across frames of the input video. In operation, the association module compares each of the object segments of the current frame (e.g., $D_t$, received from the image segmentation sub-module) to each of the estimated masks of objects in the current frame (e.g., $\widehat{M_t}$, received from the mask propagation sub-module) to identify newly segmented objects and/or correct previously segmented objects. The association module may perform any similarity analysis to compare the similarity of the segments $D_t$ to the estimated masks of segmented objects $\widehat{M_t}$ to determine whether a segmented object in the set $D_t$ (e.g., one segmented object of the set of segmented objects of the current frame) and an estimated mask in the estimated masks $\widehat{M_t}$ (e.g., one estimated mask of the set of estimated masks of the current frame) match. In one embodiment, the association module performs intersection over union to identify overlapping segmented objects/masks, where intersection over union indicates how well two segmented objects/masks match. Any matches of overlapping segmented objects (e.g., a match of a segmented object in the set of segmented objects $D_t$ with a match of an estimated masked object in the set of estimated masked objects $\widehat{M_t}$) indicate a unique object in current frame of the input video. By taking the union of the overlapping/matched segmented objects, the association module merges matched segmented objects in the set $D_t$ with estimated masks in the estimated masks $\widehat{M_t}$, creating a single estimated masked object from two masked/segmented objects.

As illustrated in FIG. 7, the method 700 includes an act 708 of displaying the frame mask of the video sequence. As described herein, the mask compiler creates a masked frame that is understandable by humans using a frame mask determined by the mask propagation sub-module. In some embodiments, the frame mask is a probability distribution indicating a likelihood of each pixel of the frame belonging to a mask. The mask compiler converts the probabilities into a mask displayed to a user. For example, the mask compiler overlays a visual indicator over each pixel belonging to the mask. Such overlayed visual indicators may be colors, patterns, and the like.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
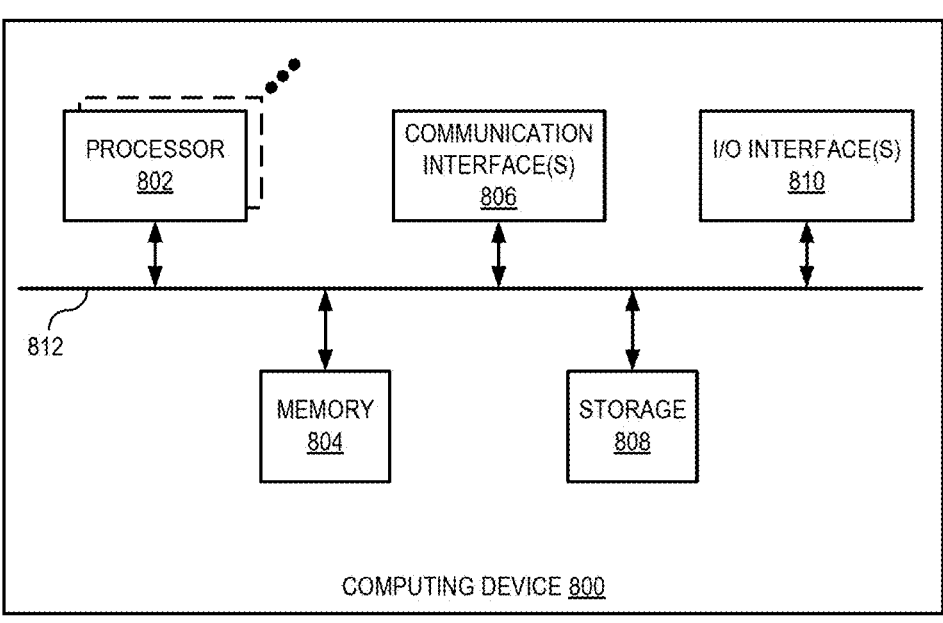
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that one or more computing devices such as the computing device 800 may implement the segmentation system. As shown by FIG. 8, the computing device can comprise a processor 802, memory 804, one or more communication interfaces 806, a storage device 808, and one or more I/O devices/interfaces 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 808 and decode and execute them. In various embodiments, the processor(s) 802 may include one or more central processing units (CPUs), graphics processing units (GPUs), field programmable gate arrays (FPGAs), systems on chip (SoC), or other processor(s) or combinations of processors.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 can further include one or more communication interfaces 806. A communication interface 806 can include hardware, software, or both. The communication interface 806 can provide one or more interfaces for communication (such as, for example, packet-based communication) between the computing device and one or more other computing devices 800 or one or more networks. As an example and not by way of limitation, communication interface 806 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

The computing device 800 includes a storage device 808 includes storage for storing data or instructions. As an example, and not by way of limitation, storage device 808 can comprise a non-transitory storage medium described above. The storage device 808 may include a hard disk drive (HDD), flash memory, a Universal Serial Bus (USB) drive or a combination these or other storage devices. The computing device 800 also includes one or more input or output ("I/O") devices/interfaces 810, which are provided to allow a user to provide input to (such as user strokes), receive output from, and otherwise transfer data to and from the computing device 800. These I/O devices/interfaces 810 may include a mouse, keypad or a keyboard, a touch screen, camera, optical scanner, network interface, modem, other known I/O devices or a combination of such I/O devices/interfaces 810. The touch screen may be activated with a stylus or a finger.

The I/O devices/interfaces 810 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 810 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
    determining an image segmentation mask which masks an object of a frame of a video sequence using the frame and an image segmentation module of a segmentation system;
    determining a mask propagation mask which masks the object of the frame of the video sequence using the frame, a representation of a previous frame of the video sequence, and a mask propagation module of the segmentation system;
    determining a frame mask which masks the object of the frame of the video sequence based on a comparison of the image segmentation mask and the mask propagation mask; and
    displaying the frame mask of the video sequence.

2. The method of claim 1, wherein determining the frame mask further comprises:
    determining that the image segmentation mask matches the mask propagation mask based on a similarity of the image segmentation mask and the mask propagation mask satisfying a threshold.

3. The method of claim 1, further comprising:
    determining a representation of the frame mask using the frame, the frame mask, and the representation of the previous frame of the video sequence; and
    storing the representation of the frame mask.

4. The method of claim 3, further comprising:
    determining a second image segmentation mask which masks each object of a plurality of objects of a second frame of the video sequence using the second frame and the image segmentation module;
    determining a second mask propagation mask which masks each object of the plurality of objects of the second frame using the second frame, the representation of the frame mask, and the mask propagation module of the segmentation system; and
    determining a second frame mask which masks each object of the plurality of objects of the frame based on a comparison of the second image segmentation mask and the second mask propagation mask.

5. The method of claim 4, further comprising:
    determining an intermediary mask by merging each masked object of the second image segmentation mask and each masked object of the second mask propagation mask that satisfy a similarity threshold; and
    determining the second frame mask using the intermediary mask, the second frame, the representation of the frame mask, and the mask propagation module of the segmentation system.

6. The method of claim 5, further comprising adding an unmatched mask objected from the second image segmentation mask or the second mask propagation mask to the intermediary mask.

7. The method of claim 3, further comprising:
    receiving a second frame of the video sequence including the object, wherein the second frame occurs at a time after the frame of the video sequence; and determining a second frame mask of the object of the second frame using the second frame, the representation of the frame mask, and the mask propagation module of the segmentation system.

8. The method of claim 1, wherein the representation of the previous frame is a feature map of the previous frame determined by the image segmentation module, wherein the previous frame occurs at a time before the frame of the video sequence.

9. The method of claim 1, wherein the image segmentation module and the mask propagation module of the segmentation system are each trained independently.

10. A non-transitory computer-readable medium storing executable instructions, which when executed by a processing device, cause the processing device to perform operations comprising:
    determining an image segmentation mask which masks an object of a frame of a video sequence using the frame and an image segmentation module of a segmentation system;
    determining a mask propagation mask which masks the object of the frame of the video sequence using the frame, a representation of a previous frame of the video sequence, and a mask propagation module of the segmentation system;
    determining a frame mask which masks the object of the frame of the video sequence based on a comparison of the image segmentation mask and the mask propagation mask; and
    displaying the frame mask of the video sequence.

11. The non-transitory computer-readable medium of claim 10, wherein determining the frame mask further comprises:
    determining that the image segmentation mask matches the mask propagation mask based on a similarity of the image segmentation mask and the mask propagation mask satisfying a threshold.

12. The non-transitory computer-readable medium of claim 10, storing instructions that further cause the processing device to perform operations comprising:
    determining a representation of the frame mask using the frame, the frame mask, and the representation of the previous frame of the video sequence; and
    storing the representation of the frame mask.

13. The non-transitory computer-readable medium of claim 12, storing instructions that further cause the processing device to perform operations comprising:
    determining a second image segmentation mask which masks each object of a plurality of objects of a second frame of the video sequence using the second frame and the image segmentation module;
    determining a second mask propagation mask which masks each object of the plurality of objects of the second frame using the second frame, the representation of the frame mask, and the mask propagation module of the segmentation system; and
    determining a second frame mask which masks each object of the plurality of objects of the frame based on a comparison of the second image segmentation mask and the second mask propagation mask.

14. The non-transitory computer-readable medium of claim 13, storing instructions that further cause the processing device to perform operations comprising:
    determining an intermediary mask by merging each masked object of the second image segmentation mask and each masked object of the second mask propagation mask that satisfy a similarity threshold; and determining the second frame mask using the intermediary mask, the second frame, the representation of the frame mask, and the mask propagation module of the segmentation system.

15. The non-transitory computer-readable medium of claim 14, storing instructions that further cause the processing device to perform operations comprising:

adding an unmatched mask objected from the second image segmentation mask or the second mask propagation mask to the intermediary mask.

16. The non-transitory computer-readable medium of claim 12, storing instructions that further cause the processing device to perform operations comprising:

receiving a second frame of the video sequence including the object, wherein the second frame occurs at a time after the frame of the video sequence; and determining a second frame mask of the object of the second frame using the second frame, the representation of the frame mask, and the mask propagation module of the segmentation system.

17. A system comprising:

a memory component; and a processing device coupled to the memory component, the processing device to perform operations comprising:

determining a first mask which masks each object of a plurality of objects of a frame of a video sequence using the frame and an image segmentation module;

determining a second mask which masks each object of the plurality of objects of the frame using the frame, a representation of a previous frame of the video sequence, and a mask propagation module;

comparing the first mask and the second mask to obtain a coarse estimation of a third mask;

refining the coarse estimation of the third mask to obtain a refined estimation using the frame, the coarse estimation of the third mask, the representation of the previous frame of the video sequence, and the mask propagation module.

18. The system of claim 17, wherein the coarse estimation of the third mask includes an estimated masked object that shares one or more pixels of a first object of the plurality of objects and a second object of the plurality of objects.

19. The system of claim 17, wherein the representation of the previous frame is a feature map of the previous frame determined by the image segmentation module, wherein the previous frame occurs at a time before the frame of the video sequence.

20. The system of claim 17, wherein an object of the plurality of objects is a background object or a foreground object.

* * * * *